United States Patent [19]

Walter et al.

[11] 4,277,253

[45] Jul. 7, 1981

[54] GRANULATING AN AQUEOUS DISPERSION OF AMMONIUM AND POTASSIUM SALTS

[75] Inventors: Karl H. Walter, Henley South; John D. Johnston, Elizabeth Park; Dennis Wetherley, Salisbury Park, all of Australia

[73] Assignee: Adelaide & Wallaroo Fertilizers Ltd., Adelaide, Australia

[21] Appl. No.: 104,068

[22] Filed: Dec. 17, 1979

[30] Foreign Application Priority Data

Dec. 22, 1978 [AU] Australia .............................. PD7189

[51] Int. Cl.$^3$ .......................... C05G 3/00; C05C 7/02; C05D 11/00
[52] U.S. Cl. ..................................... 23/313 R; 71/61; 71/63; 71/64 DA; 71/64 DB; 264/117
[58] Field of Search ........... 23/313 R, 313 P, 313 FB; 71/64 D, 64 DA, 64 DB, 64 DC, 64 F, 61, 63; 264/117, 37, 109

[56] References Cited

U.S. PATENT DOCUMENTS

| | | | |
|---|---|---|---|
| 1,608,737 | 11/1926 | Harvey | 71/61 X |
| 1,969,980 | 8/1934 | Harvey | 71/61 |
| 2,867,523 | 1/1959 | Lutz et al. | 23/313 R X |
| 3,143,410 | 8/1964 | Smith | 71/64 D |
| 3,697,245 | 10/1972 | Dilday | 71/64 F X |
| 3,853,490 | 12/1974 | Boeglin et al. | 23/313 R |
| 3,925,053 | 12/1975 | Kealy | 71/64 F X |
| 4,183,738 | 1/1980 | Carmon | 71/64 DA X |

*Primary Examiner*—Bradley Garris
*Attorney, Agent, or Firm*—Cushman, Darby & Cushman

[57] ABSTRACT

The preparation of dry, stable granular material from water-soluble potassium and ammonium salts and a mixture thereof by subjecting a dispersion of crystals of the salt in an aqueous liquid to the action of a granulating device in the presence of calcium sulphate hemihydrate and a hydrophilic surface active agent to effect agglomeration of said crystals, and thereafter subjecting the agglomerated crystals to a drying operation.

17 Claims, 1 Drawing Figure

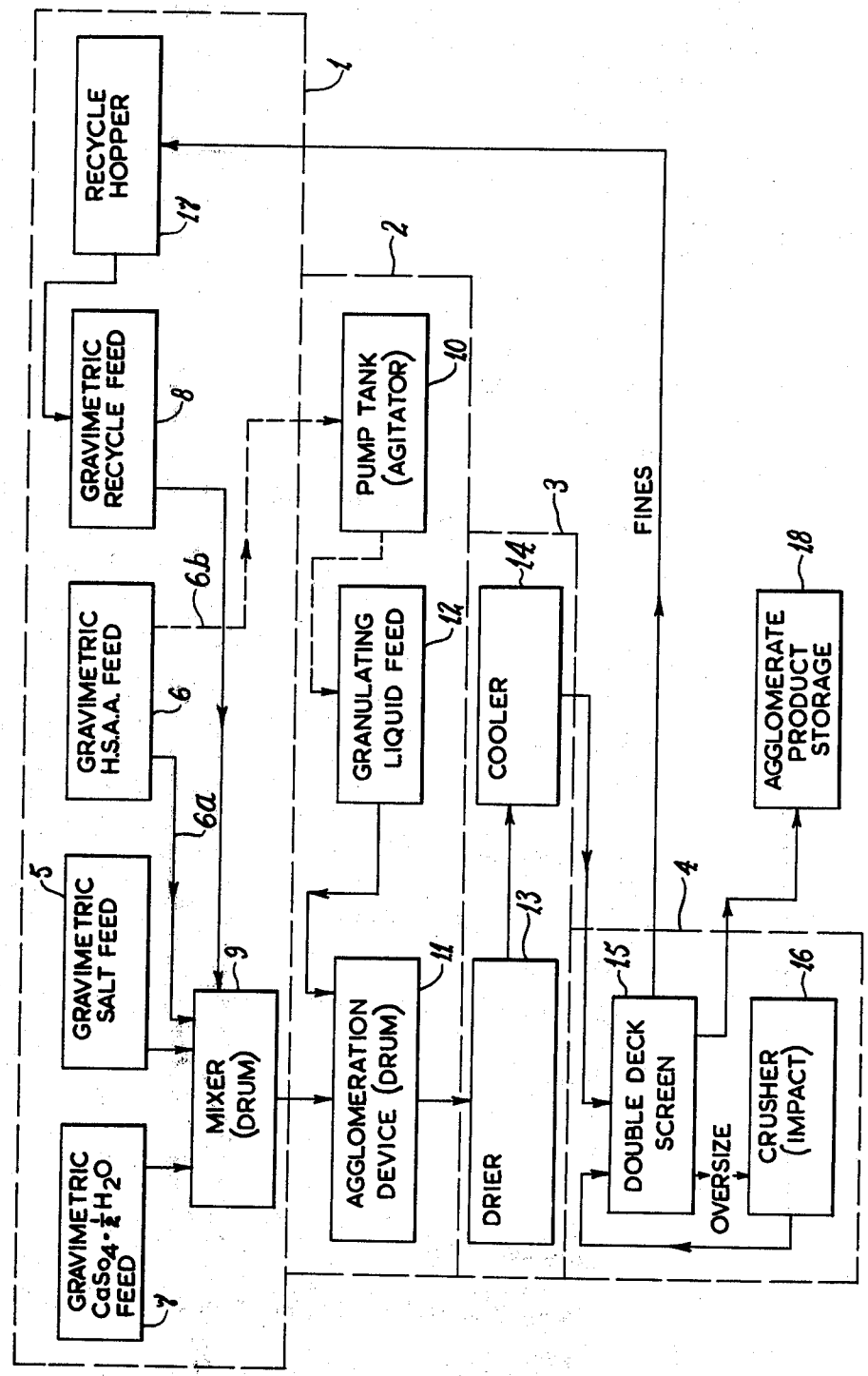

GRANULATING AN AQUEOUS DISPERSION OF AMMONIUM AND POTASSIUM SALTS

This invention relates to a process for the granulation of potassium salts and/or ammonium salts. The process has particular application to the production of a dry stable granular ammonium sulphate, potassium sulphate or potassium chloride or a mixture thereof, such as in a suitable granulating device, for use as a fertilizing material.

The grain size of potassium salts as well as ammonium sulphate varies considerably according to the method of manufacture. Usually the crystal size can vary between 0.1 mm and 2 mm. Fertilizers having such a small grain size are not well suited for blending with other well granulated primary nutrients as they cause serious problems in regard to segregation. Also they are not ideal for direct application to the field through spreading machines.

The fertility status of a soil often requires the application of more than one nutrient for the correction of nutritional disorders in the soil. While it is common practice to produce granular, multiple-nutrient fertilizers, in which each granule contains the primary nutrients N-P, or N-P-K or P-K in a definite predetermined ratio, this ratio will not always meet the requirements of a particular soil. Thus a producer of fertilizers has either to produce a great number of N-P-K type fertilizers in a granule form, or mix together physically the primary nutrients.

These mechanically mixed fertilizers, or bulk blended fertilizers allow the production of an infinite number of ratios in regard to their content of primary nutrients. Bulk blending is, however, only a practical proposition as long as the fertilizer materials used in the preparation of the bulk blended mixed fertilizer are well granulated and have not only a close, but also a very similar, spectrum of sizings.

While the agglomerative granulation of fertilizer materials containing phosphorus is relatively simple, it previously has not been possible to form granules of ammonium sulphate, potassium sulphate or potassium chloride or any mixtures of these salts with each other in any proportion in a practical manner in a cascading bed of solids in such conventional agglomerative granulating devices as a rotating drum or pan, or a blunger. Attempts to granulate any of these salts or their mixtures in any of these devices has produced a wet crystalline pulp during the wetting of the cascading bed which can not be coalesced and agglomerated into spheres.

Relatively coarse particle sizes of potassium salts may be produced directly during the beneficiation-flotation for the recovery of potassium salts from its ore. The production of larger grain sizes during the beneficiation-flotation process adversely affects, however, the beneficiation efficiency (recovery) as well as the grade of the finished product.

The same applies to the formation of large crystals during crystallization. The production of large crystals during crystallisation considerably reduces the capacity of the crystalliser. In addition, impurities in the mother liquor will impose limitations in regard to the particle size of the crystals and have proved troublesome during the operation of these controlled crystallisation processes.

In view of the many shortcomings of these processes, which are not only inefficient from an economic point of view but have serious product size limitations, the producers of these soluble fertilizer salts have been forced to develop some other means for the production of larger product sizes. One of these processes employs hydraulically operated high pressure compaction rolls for the production of dense flakes from the small particles of the feed. These dense flakes are crushed in impact-type crushers and then screened for the removal of the material in the desired particle size range. The oversize is returned to the crusher and the screen while the fines are recycled to the compaction rolls. While this compaction process allows the production of a particulate product within a desired size range, the particles produced are not spherical but angularly and irregularly shaped and, consequently, the rheology of granules produced by the compactor process is rather poor. The compactor process can be used for the production of coarse particulate potassium salts and ammonium salts.

Another process, which was developed by the National Fertilizer Development Center of the Tennessee Valley Authority (U.S.A.) can only be used for the production of a granular ammonium sulphate. In this process sulphuric acid and ammonia are pre-neutralised in a reactor to an $NH_3:H_2SO_4$ molar ratio of 1:1. The pre-neutralised fluid which usually contains less than 10% of free water, and has a temperature of about 150° C., is then fully ammoniated and granulated in a TVA drum granulator operating at a recycle ratio of about 1:1. The heat evolved during the ammoniation makes the drying of the granules superfluous. The granules discharged from the drum are cooled and screened. The oversize is disintegrated and recycled to the double deck screen, while the fines are returned to the drum granulator. This process produces spherical granules, but its use depends upon the availability of cheap ammonia. In addition the ammonium sulphate produced in this manner is most of the time not competitive with by-product ammonium sulphate from coke ovens.

The prior granulation processes for potassium and ammonium salts are either inefficient or provide a product having poor flow characteristics, and it is the object of this invention to provide an improved method for the production of spherical granules of potassium or ammonium salts or mixtures thereof by agglomerative granulation.

Despite the fact that agglomerative granulation is employed on a very large scale in the fertilizer, cement and lime industries, as well as in many branches of the metallurgical industry for the treatment of ore concentrates, there generally still exists a lack of knowledge in regard to the basic mechanism of this type of granulation. Though most theories and hypotheses in regard to the granulation of fertilizers, ore concentrates and kiln feeds explain to a certain extent what is happening during the agglomerative granulation of these materials, they do not provide an explanation as to why very water-soluble salts will not coalesce during wetting and tumbling in a cascading bed of solids, but form a wet crystalline pulp.

Most of these theories mainly deal with the effects of the particle size distribution of the fines, the granule size, the tumbling action and the liquid phase upon the coalescence during granulation. Generally speaking these theories stipulate that in a cascading bed of solids the non-granular feed as well as the granules themselves are subject to rather complex mechanical forces, which will lead to the coalescence of the solid particles in the presence of a granulating liquid.

During the nucleation stage or the initial coalescence of the solid particles, they are mainly held together by the surface tension of the granulating liquid. As the tumbling or cascading of the solid particles continues, the originally large pores within the granules will be considerably reduced in size, and liquid will be forced out of these pores onto the surface of the granules, which in turn picks up additional solids, thereby increasing the size of the granules. At the same time the surface of the solid particles in the granules are brought sufficiently close together to allow the much stronger surface forces or forces of adhesion to give the granules additional strength. Continued tumbling will round off these agglomerates and produce spherical particles. The combined action of surface tension and adhesion is responsible for the mechanical strength of the granules in their wet state.

We have been able to demonstrate that the greater the mechanical force upon the granules in the granulating device, the lower will be the requirements in regard to granulating liquid, and the greater will be the mechanical strength of the granule. In addition it is established that there is an optimum particle size distribution for solids to be agglomerated. Generally speaking we can state that solid powders having a wide particle size spectrum, which means that the powder contains coarse, medium sized, fine as well as very fine particles, are easier to granulate by agglomeration than powders with a narrow particle size spectrum or in other words a powder made up of particles having very similar particle diameters.

It is thought that the effects of the particle size distribution upon the coalescence of solids as well as the particle strength is due to the fact that the void space or pores formed by the large or coarse particles is occupied by medium sized particles, while the pores formed by medium sized particles will be filled with fines, thereby increasing considerably the surface to surface contact between the individual particles forming the agglomerate and thus leading to a high degree of adhesion within the granules.

Attempts to employ conventional methods of granulation for the production of granules from highly water-soluble salts have so far not been successful.

We have now found that the addition of calcium sulphate hemihydrate and hydrophilic surface active materials prevents the formation of this wet crystalline pulp during granulation. Suitable hydrophilic surface active materials are, for example, attapulgite clay, bentonite clay, calcium or sodium lignosulphonates, casein, methyl-cellulose, agar, gelatine, aqueous dispersions of polyvinyl acetate or such high molecular weight water-soluble ionic polymers derived from acrylamine and salts of acrylic acid such as Sedipur, Aerofloc or Separan. Hydrophilic materials are chemical substances of organic or inorganic origin which have the tendency to bind water or have a great affinity for water. Sedipur, Aerofloc and Separan are registered trade names for organic polymers.

Thus according to the invention, there is provided a process for the preparation of dry, stable granular water-soluble potassium and/or ammonium salts wherein a dispersion of crystals of at least one said salt in an aqueous liquid is subjected to the action of a granulating device in the presence of calcium sulphate hemihydrate and a hydrophilic, surface active agent to effect agglomeration of said crystals, and the resultant agglomerated crystals subjected to a drying operation.

In addition we were able to demonstrate that the crushing of water-soluble salts having a narrow particle size spectrum, to increase particle size distribution will assist considerably in the formation of granules of these salts. Particle size distribution found to be suitable in performance of the invention are as follows:

| SCREEN APERTURE mm | % CUMULATIVE RETAINED | | |
|---|---|---|---|
| | AMMONIUM SULPHATE | POTASSIUM CHLORIDE | POTASSIUM SULPHATE |
| 4.75 | 0.1 to 0.5 | 0.1 to 1.0 | 0.2 to 0.7 |
| 2.00 | 0.5 to 0.8 | 4.0 to 10 | 3.0 to 9.0 |
| 1.20 | 0.8 to 4.7 | 7.0 to 60 | 6.0 to 55.0 |
| 0.71 | 4.6 to 25.1 | 40.0 to 85 | 43.0 to 87.0 |
| 0.50 | 25.2 to 49.3 | 85.0 to 95 | 83.0 to 96.0 |
| 0.25 | 80.9 to 81.5 | 90.0 to 97 | 91.0 to 98.0 |
| 0.15 | 97.8 to 94.5 | 98.5 to 99.5 | 98.0 to 99.6 |
| 0.15 passing | 2.2 to 5.5 | 1.5 to 0.5 | 2.0 to 0.4 |

The mean particle size of the water soluble salts preferably is greater than that of the calcium sulphate hemihydrate. Most preferably, there is a substantial difference in mean particle size and, while the extent of this difference is difficult to quantify, the foregoing data on particles size distributions for the water soluble salts and the particle size distribution for the calcium sulphate hemihydrate set out below indicate the order of magnitude for the difference found to be well suited to obtaining good agglomeration.

The use of concentrated aqueous solutions of the salt instead of water as a granulating liquid, also considerably assists in the formation of granules from the salts.

The hydrophilic surface active agent employed in this invention is added for the purpose of altering the surface charges, on the solid liquid interface, which are responsible for the repulsion between the crystalline particles. It is thought that the hydrophilic surface active agent discharges the electrical surface charges of the crystals and thus allows the crystals to coalesce instead of forming a dispersed wet crystalline pulp.

$KCl$, $K_2SO_4$ and $(NH_4)_2SO_4$ have a relatively low surface energy, and the crystals of these salts are neither plastic nor deformable. Consequently, only relatively weak forces of adhesion per unit area will be available to adhere the individual crystals together.

The calcium sulphate hemihydrate, which is a very fine powder and has a higher surface energy than the water-soluble salts, increases the surface-to-surface contact area between the individual granules during the process of agglomeration. Calcium sulphate hemihydrate is conventionally traded under the name of plaster of Paris. This material generally is very fine and, while normally having a broad particle size distribution, as is preferred, this distribution can vary considerably. Typical particle size distributions found to be well suited to the invention are as follows:

| SIEVE ANALYSIS OF $CaSO_4 \cdot \frac{1}{2}H_2O$ | |
|---|---|
| SCREEN APERTURE mm | % CUMULATIVE RETAINED |
| 0.250 | 1 to 4 |
| 0.150 | 6 to 30 |
| 0.75 | 40 to 65 |
| 0.53 | 70 to 85 |
| 0.53 passing | 15 to 30 |

The use of a concentrated hot aqueous solution of the salt to be granulated as a granulating liquid instead of steam or water assists in the formation of the granules. This is due to the small crystals, which have an extremely large surface area, dissolving very rapidly in water as the granulating liquid, if water is used, but being retained when a concentrated solution, intead of water, is used. The small particles or crystals thus retained in the wet solid increase the surface-to-surface contact in the agglomerate.

During the process of drying, the granules become very strong and hard. The granule strength is mainly based upon the interlocking of crystal bridges between the individual particles of the closely packed granules.

The principles of this invention furnish an extremely simple arrangement for the production of stable granular potassium salts and/or ammonium sulphate. It permits use of conventional granulating devices, and is distinguished from other processes in that it can be performed in any conventional granulating plant.

A preferred embodiment of this invention is given in detail hereunder with reference to the flowsheet of the accompanying drawing, but the invention is not necessarily limited to the details of this embodiment.

It is preferable that the granulating plant consists of the following sections:

A. Proportioning & Mixing Section.
B. Granulating or Agglomeration Section.
C. Drying Section.
D. Classification and Oversize Reduction Section.

Briefly the following unit operations are performed in these various sections.

A. Proportioning & Mixing Section

In this section 1, the potassium and/or ammonium salt is continuously metered into a mixer where it is mixed with the desired quantity of a hydrophilic surface active agent as well as the calcium sulphate hemihydrate. The metering of these three raw materials is preferably performed by respective gravimetric continuous feeding devices 5, 6 and 7. A similar device 8 may be employed for the metering of the recycle stream. The mixer 9 itself can either be a short drum, a mixer conveyor or any other mixing device normally employed for this unit operation in the fertilizer industry. In an alternative arrangement, the hydrophilic surface active agent is added to the salt via the granulating liquid (on line 6b rather than line 6a), the bentonite or any similar hydrophilic surface active agent for example being metered into a small pump tank 10 equipped with a high speed agitator.

B. Granulating Section

The agglomeration or granulation of this section 2 may be carried out in any conventional device 11 such as a granulating drum, pan granulator, pugmill etc., by the addition of the granulating liquid from feed device 12 which might consist of either hot or cold water, or an aqueous suspension of the hydrophilic surface active agent, or a saturated hot or cold aqueous solution of the salt. It is preferred that the granules from the granulating device are handled with some care to avoid the destruction of the granules before they enter the drying section. While any of the previously mentioned granulating devices can be used for the granulation of these water-soluble salts, we prefer the drum granulator for this type of material. The temperature of the granulating liquid can vary between 15° C. and 100° C. Preferably the granulating liquid should be hot to obtain a higher salt concentration in the granulating liquid and obviously a higher granule strength. In the case where steam is used for the agglomeration, the hydrophilic surface active agent has to be added to the salt to be granulated.

C. Drying and Cooling Section

For this section 3, the drying is best performed in a co-current rotary drier 13, as normally employed in the fertilizer industry. Similarly, cooling may be performed in a rotary drum cooler 14 as normally employed in the fertilizer industry.

D. Classification and Oversize Reduction

In this section 4, the dried and cooled granules are fed onto a double deck screen 15 for classification. The oversize is crushed in an impact type crusher 16 and then returned to the double deck screen 15 as conventionally employed by the fertilizer industry. While the fines are returned to the recycle hopper 17 in the proportioning section, the granular product is conveyed to storage 18.

While the granulating equipment described in this embodiment is considered to be ideal equipment for the granulation of the water-soluble salts, it is intended to be in an illustrative sense and not in a limiting sense, and any deviation from the equipment described in this embodiment will not affect the spirit of this invention.

The following examples will demonstrate several preferred embodiments of the present invention:

EXAMPLE I

Hard and stable granules of water-soluble salts were prepared in this example, incorporating the hydrophilic surface active agent as well as the calcium sulphate hemihydrate into the water-soluble salts prior to granulation. In this and the following examples, the granulation was carried out in a drum granulator. The granules were dried in a rotary drier to a maximum moisture content of 0.5%. The following table shows the raw materials used in these tests which yielded each time a stable granular material.

| | GRANULATION OF AMMONIUM SULPHATE | | | | |
|---|---|---|---|---|---|
| | % W/W OF TOTAL SOLIDS | | | GRANULATING LIQUID | |
| TEST RUN NO. | $(NH_4)_2SO_4$ | HYDROPHILIC SURFACE ACTIVE AGENT | $CaSO_4 \cdot \frac{1}{2}H_2O$ | % OF SOLIDS | TEMP. °C. |
| | | BENTONITE: | | | |
| 1.1 | 95.8 | 0.9 | 3.3 | 18.0 | Ambient |
| 1.2 | 93.7 | 1.3 | 5.0 | 17.8 | " |
| 1.3 | 94.2 | 0.8 | 5.0 | 17.0 | " |
| 1.4 | 94.3 | 0.7 | 5.0 | 16.5 | " |
| 1.5 | 93.0 | 2.0 | 5.0 | 18.6 | " |

-continued

GRANULATION OF AMMONIUM SULPHATE

| TEST RUN NO. | % W/W OF TOTAL SOLIDS | | | GRANULATING LIQUID | |
|---|---|---|---|---|---|
| | (NH4)2SO4 | HYDROPHILIC SURFACE ACTIVE AGENT | CaSO4 . ½H2O | % OF SOLIDS | TEMP. °C. |
| 1.6 | 92.0 | 3.0 | 5.0 | 15.0 | " |
| 1.7 | 91.0 | 4.0 | 5.0 | 13.1 | " |
| 1.8 | 90.0 | 5.0 | 5.0 | 11.1 | " |
| | | ATTAPULGITE CLAY: | | | |
| 1.9 | 94.5 | 0.5 | 5.0 | 17.3 | " |
| 1.10 | 94.0 | 1.0 | 5.0 | 13.3 | " |
| 1.11 | 93.9 | 1.1 | 5.0 | 14.7 | " |
| | | SEPARAN N.10 | | | |
| 1.12 | 94.9 | 0.1 | 5.0 | 12.0 | " |
| 1.13 | 94.7 | 0.3 | 5.0 | 12.0 | " |
| | | SEDIPUR T.F. | | | |
| 1.14 | 94.9 | 0.1 | 5.0 | 15.0 | " |
| 1.15 | 94.0 | 1.0 (AGAR) | 5.0 | 18.0 | " |
| 1.16 | 95.0 | 1.0 (METHYL-CELLULOSE) | 4.0 | 17.0 | " |
| 1.17 | 94.0 | 1.0 (GELATINE) | 5.0 | 18.0 | " |

EXAMPLE II

In a second series of granulation tests the quantities of the hydrophilic surface active agent shown in the table of Example I were incorporated into the granulating liquid and this liquid containing the hydrophilic surface active agent was then sprayed onto a mixture of ammonium sulphate and calcium sulphate hemihydrate having the same composition as those shown in the table in Example I. The granules produced in Example I possessed excellent physical properties. Generally, the agglomeration of the crystals was better with the hydrophilic surface active agent being applied to the ammonium sulphate in the granulating liquid than that in Example I.

EXAMPLE III

Excellent hard granules were prepared from potassium sulphate by either incorporating the hydrophilic surface active agent as a powder into the mixture of potassium sulphate with calcium sulphate hemihydrate, or by incorporating the hydrophilic surface active agent via the granulating liquid.

The composition of the potassium sulphate granules is shown in the following table:

GRANULATION OF POTASSIUM SULPHATE

| TEST RUN NO. | % W/W OF TOTAL SOLID | | | GRANULATING LIQUID | |
|---|---|---|---|---|---|
| | K2SO4 | HYDROPHILIC SURFACE ACTIVE AGENT | CALCIUM SULPHATE HEMI-HYDRATE | % OF SOLIDS | TEMP. °C. |
| | | BENTONITE: | | | |
| 3.1 | 94.0 | 1 | 5 | 16 | Ambient |
| 3.2 | 94.4 | 0.6 | 5 | 16 | " |
| 3.3 | 94.5 | 0.5 | 5 | 13 | 60° C. |
| 3.4 | 95.9 | 0.8 | 3.3 | 16 | Ambient |
| 3.5 | 95.9 | 0.8 | 3.3 | 15 | 60° C. |
| 3.6 | 96.4 | 0.3 | 3.3 | 15 | Ambient |
| 3.7 | 95.9 | 0.8 | 3.3 | 13 | Steam |
| | | P.V.A. EMULSION | | | |
| 3.8 | 92.0 | 3.0 | 5.0 | 12 | 60° C. |

These tests demonstrated that the use of hot granulating liquid assists the coalescence of the particles. During these tests we observed that the incorporation of bentonite into the granulating liquid did not offer any advantages.

EXAMPLE IV

Additional granulation tests were carried out with potassium chloride and bentonite or attapulgite as a hydrophilic surface active agent. In these examples the hydrophilic surface active agent was always added to the potassium chloride as a dry powder. The composition of these granules, and the quantity of granulating liquid was as follows:

| TEST RUN NO. | % W/W OF TOTAL SOLID | | | GRANULATING LIQUID | |
|---|---|---|---|---|---|
| | KCl | HYDROPHILIC SURFACE ACTIVE AGENT | CALCIUM SULPHATE HEMI-HYDRATE | % OF SOLIDS | TEMP. °C. |
| | | BENTONITE | | | |
| 4.1 | 94.5 | 0.5 | 5 | 20.0 | 60° C. |
| 4.2 | 94.0 | 1.0 | 5 | 17.0 | 60° C. |
| 4.3 | 93.0 | 2.0 | 5 | 16.7 | 60° C. |
| 4.4 | 91.0 | 4.0 | 5 | 15.0 | 60° C. |
| | | ATTAPULGITE | | | |
| 4.5 | 94.5 | 0.5 | 5 | 18.0 | 60° C. |
| 4.6 | 94.0 | 1.0 | 5 | 17.2 | 60° C. |
| 4.7 | 93.5 | 1.5 | 5 | 16.0 | 60° C. |
| 4.8 | 93.0 | 2.0 | 5 | 15.0 | 60° C. |

All of the granules produced with the aid of attapulgite possessed better physical properties than those produced with bentonite, although excellent hard granules were produced in each case.

EXAMPLE V

Other formulations with attapulgite clay were prepared with KCl and (NH4)2SO4 mixtures. These mixtures, which had the same water-soluble salt to hydrophilic surface active agent ratio as those in test runs 4.5, 4.6, 4.7 and 4.8, were much easier to granulate than KCl or (NH4)2SO4 on its own. A sizing analysis showed that the mixtures possessed a much wider size spectrum than the KCL or the (NH4)2SO4 on its own.

EXAMPLE VI

The following tests were carried out to establish the effects of the particle size distribution of soluble salts upon their granulation. Potassium chloride as received from the producer was crushed through a disc mill. Crushed and uncrushed KCl were granulated with the aid of 1% attapulgite clay, 5% calcium sulphate hemihydrate and 16% water. The crushed KCl was considerably easier to granulate than the uncrushed material. In addition the granules produced from crushed KCl were harder than those produced from the uncrushed KCl.

The feed to the granulator had the following size distribution:

| SIEVE ANALYSES OF KCl FEED | | |
|---|---|---|
| SCREEN APERTURE | % CUMULATIVE RETAINED | |
| mm | KCl As Received | KCl After Crushing |
| 4.75 | 0.2 | nil |
| 2.00 | 0.4 | 0.1 |
| 1.20 | 6.1 | 0.6 |
| 0.71 | 38.1 | 13.5 |
| 0.50 | 65.5 | 36.4 |
| 0.25 | 90.7 | 63.3 |
| 0.15 | 96.9 | 76.4 |
| 0.15 passing | 3.1 | 23.6 |

EXAMPLE VII

In another series of tests potassium chloride, which had been crushed, was granulated with both water and a saturated solution of KCl. The granules produced with the aid of the saturated salt solution required, at the same degree of granulation, only about half of the quantity of the attapulgite clay.

General

In granulating water-soluble salts of potassium and/or ammonium, such as for example ammonium sulphate, potassium sulphate, potassium chloride or their admixtures in accordance with the present invention, the quantity of hydrophilic surface active agent required may vary between 0.1% w/w to 5% w/w for good granulation. However, it is preferred that the hydrophilic surface active agents be kept at 1% w/w by increasing the residence time in the granulator. The greater the mechanical forces in the tumbling bed of the granulating device, the less will be the amount of hydrophilic surface active agent required.

To achieve good performance in regard to granulation, the hydrophilic surface active agent as well as the calcium sulphate hemihydrate should be admixed intimately with the water-soluble salts. The amount of calcium sulphate hemihydrate required will vary with the size distribution of the water-soluble salts. With very coarse uncrushed crystalline water-soluble salt materials, amounts as high as 10% w/w $CaSO_4.\frac{1}{2}H_2O$ were required to achieve satisfactory granulation. However, with fine crystalline water-soluble salt materials, the amount of the calcium sulphate hemihydrate may be as low as 0.5% w/w.

Finally, it is to be understood that various alterations, modifications and/or additions may be introduced into the formulations and arrangements of the present invention without departing from the spirit or ambit of the invention and the scope of the appended claims.

We claim:

1. A process for the preparation of dry, stable granular material from a salt selected from the group consisting of water-soluble potassium and ammonium salts selected from the group consisting of potassium sulfate, potassium chloride, ammonium sulfate and mixtures thereof, said process comprising the steps of:
   (1) crushing the salt, dispersing said crushed salt in an aqueous liquid to produce a dispersion of salt crystals,
   (2) subjecting said dispersion of crystals of at least one said salt in an aqueous liquid to the action of a granulating device in the presence of 0.5 to 10% w/w of calcium sulfate hemihydrate and 0.1 to 5% w/w of a hydrophilic surface active agent to effect agglomeration of said crystals, and
   (3) drying the resultant agglomerated crystals to produce the dry, stable granular material, said percentages being with respect to said salt.

2. A process as claimed in claim 1, in which the calcium sulphate hemihydrate is added to the salt in the form of a slurry.

3. A process as claimed in claim 1, in which the aqueous liquid has a temperature in the range from 15° C. to 100° C.

4. A process as claimed in claim 1, in which the aqueous liquid is provided by charging steam to the granulating device.

5. A process as claimed in claim 1, in which the aqueous liquid is an aqueous solution of the water-soluble crystalline salt.

6. A process as claimed in claim 5, in which the aqueous liquid is an aqueous saturated solution of the water-soluble crystalline salt.

7. A process as claimed in claim 5 in which said aqueous solution is a hot aqueous solution.

8. A process as claimed in claim 1 in which a hydrophilic surface active agent comprising an attapulgite clay is used.

9. A process as claimed in claim 1, in which a hydrophilic surface active agent comprising a bentonitic clay is used.

10. A process as claimed in claim 1, in which a hydrophilic surface active agent comprising an aqueous dispersion of polyvinyl acetate is used.

11. A process as claimed in claim 1, in which a hydrophilic surface active agent is selected from calcium and sodium lignosulphonates.

12. A process as claimed in claim 1, wherein the hydrophilic surface active agent is a dry solid and is admixed with the salt before agglomeration.

13. A process as claimed in claim 1, wherein the hydrophilic surface active agent is added to the salt with the aqueous liquid.

14. A process as claimed in claim 1, wherein the hydrophilic surface active agent and the calcium sulphate hemihydrate are added in the form of a slurry.

15. A process as claimed in claim 1, wherein said hydrophilic surface active agent is selected from the group consisting of attapulgite clay, bentonitic clay, calcium lignosulphonate, sodium lignosulphonate, casein, methyl-cellulose, agar, gelatine, aqueous dispersions of polyvinyl acetate, and high molecular weight water-soluble ionic polymers derived from acrylamine and salts of acrylic acid.

16. A process for the preparation of dry, stable granular material from a salt selected from the group consisting of water-soluble potassium and ammonium salts and a mixture thereof, said process comprising the steps of: granulating a dispersion of crystals of at least one said salt in an aqueous liquid in a granulating device in the presence of 0.5 to 10% w/w of calcium sulfate hemihydrate and 0.1 to 5% w/w of a hydrophilic surface active agent to effect agglomeration of said crystals, said percentages being with respect to said salt, said aqueous liquid being an aqueous solution of said water-soluble crystalline salt and thereafter drying the resultant agglomerated crystals to produce a dry, stable, granular material.

17. A process as claimed in claim 16, wherein the aqueous liquid is an aqueous saturated solution of the water-soluble crystalline salt.

* * * * *